(12) United States Patent
Bernstein et al.

(10) Patent No.: US 8,929,733 B2
(45) Date of Patent: Jan. 6, 2015

(54) OPEN SHORTEST PATH FIRST EXTENSIONS IN SUPPORT OF WAVELENGTH SWITCHED OPTICAL NETWORKS

(71) Applicant: Futurewei Technologies, Inc., Plano, TX (US)

(72) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 179 days.

(21) Appl. No.: 13/736,237

(22) Filed: Jan. 8, 2013

(65) Prior Publication Data

US 2013/0121694 A1  May 16, 2013

Related U.S. Application Data

(63) Continuation of application No. 12/711,387, filed on Feb. 24, 2010, now Pat. No. 8,374,502.

(60) Provisional application No. 61/156,285, filed on Feb. 27, 2009.

(51) Int. Cl.
| | | |
|---|---|---|
| *H04B 10/00* | (2013.01) | |
| *H04J 14/02* | (2006.01) | |
| *H04L 12/751* | (2013.01) | |
| *H04L 12/723* | (2013.01) | |
| *H04L 12/721* | (2013.01) | |
| *H04Q 11/00* | (2006.01) | |

(52) U.S. Cl.
CPC ............... *H04J 14/02* (2013.01); *H04L 45/02* (2013.01); *H04L 45/026* (2013.01); *H04L 45/50* (2013.01); *H04L 45/62* (2013.01); *H04Q 11/0062* (2013.01); *H04J 14/0257* (2013.01); *H04J 14/0258* (2013.01); *H04J 14/0268* (2013.01); *H04J 14/0269* (2013.01); *H04J 14/0273* (2013.01); *H04J 14/0212* (2013.01); *H04Q 2011/0073* (2013.01); *H04Q 2011/0086* (2013.01)
USPC ............ 398/45; 398/51; 398/54; 398/57

(58) Field of Classification Search
CPC ........................................................ H04B 10/00
USPC ...................................................... 398/45–57
See application file for complete search history.

(56) References Cited

U.S. PATENT DOCUMENTS

| 6,985,959 B1 | 1/2006 | Lee |
|---|---|---|
| 7,782,798 B2 | 8/2010 | Xu |

(Continued)

FOREIGN PATENT DOCUMENTS

CN          1503532 A      6/2004

OTHER PUBLICATIONS

Bernstein, G., et al., "General Network Element Constraint Encoding for GMPLS Controlled Networks," Network Working Group, Internet Draft, draft-ietf-ccamp-general-constraint-encode-01.txt, Mar. 2, 2010, 28 pages.

(Continued)

*Primary Examiner* — Agustin Bello
(74) *Attorney, Agent, or Firm* — Conley Rose P.C.; Grant Rodolph; Brandt D. Howell

(57) ABSTRACT

A network component comprising a generalized multiprotocol label switching (GMPLS) control plane controller configured to implement a method comprising transmitting a message to at least one adjacent control plane controller, wherein the message comprises a Type-Length-Value (TLV) indicating Routing and Wavelength Assignment (RWA) information, wherein the TLV comprises a Node Attribute TLV, a Link Set TLV, or both, and wherein the TLV further comprises at least one sub-TLV indicating additional RWA information. A method comprising communicating an open shortest path first (OSPF) link state advertisement (LSA) message comprising a TLV with at least one sub-TLV to a GMPLS control plane controller, wherein the TLV comprises a Node Attribute TLV, a Link Set TLV, or both, and wherein the TLV further comprises at least one sub-TLV indicating RWA information.

20 Claims, 6 Drawing Sheets

(56) References Cited

U.S. PATENT DOCUMENTS

| | | | |
|---|---|---|---|
| 7,899,326 B2 | | 3/2011 | Shi et al. |
| 8,433,192 B2* | | 4/2013 | Frankel et al. ............... 398/16 |
| 2001/0029543 A1* | | 10/2001 | Iwata et al. ................. 709/233 |
| 2003/0147645 A1 | | 8/2003 | Imajuku et al. |
| 2004/0120705 A1 | | 6/2004 | Friskney et al. |
| 2005/0010685 A1 | | 1/2005 | Ramnath et al. |
| 2006/0155873 A1* | | 7/2006 | Twata et al. ................. 709/240 |
| 2007/0160039 A1 | | 7/2007 | Xu |
| 2008/0056717 A1* | | 3/2008 | Niven-Jenkins et al. ....... 398/57 |
| 2008/0170856 A1 | | 7/2008 | Shi et al. |
| 2010/0142943 A1* | | 6/2010 | Frankel et al. ............... 398/25 |
| 2010/0183308 A1* | | 7/2010 | Gerstel et al. ................ 398/79 |
| 2010/0220996 A1* | | 9/2010 | Lee et al. .................... 398/25 |
| 2010/0221003 A1 | | 9/2010 | Bernstein et al. |
| 2011/0013908 A1* | | 1/2011 | Gazzola et al. ............... 398/48 |
| 2013/0007266 A1* | | 1/2013 | Jocha et al. .................. 709/224 |
| 2013/0010612 A1* | | 1/2013 | Lee et al. .................... 370/248 |
| 2013/0077970 A1* | | 3/2013 | Lee et al. .................... 398/48 |
| 2013/0236169 A1* | | 9/2013 | Gaudette et al. ............. 398/25 |

OTHER PUBLICATIONS

Otani, T., et al., "Generalized Labels for G.694 Lambda-Switching Capable Label Switching Routers," Internet Draft, draft-ietf-ccamp-gmpls-g-694-lambda-labels-03.txt, Jan. 13, 2009, 16 pages.

Otani, T., et al., "Genralized Labels for G.694 Lambda-Switching Capable Label Switching Routers," Internet Draft, draft-ietf-ccamp-gmpls-g-694-lambda-labels-05.txt, Dec. 7, 2009, 14 pages.

Bernstein, G., et al., "Routing and Wavelength Assignment Information Model for Wavelength Switched Optical Networks," Network Working Group, Internet Draft, draft-ietf-ccamp-rwa-info-01.txt, Nov. 3, 2008, 34 pages.

Lee, Y., et al., "Routing and Wavelength Assignment Information Model for Wavelength Switched Optical Networks," Network Working Group, Internet Draft, draft-ietf-ccamp-rwa-info-07.txt, Feb. 18, 2010, 23 pages.

Bernstein, G., et al., "Routing and Wavelength Assignment Information Encoding for Wavelength Switched Optical Networks," Network Working Group, Internet Draft, draft-ietf-ccamp-rwa-wson-encode-00.txt, Dec. 18, 2008, 42 pages.

Bernstein, G., et al., "Routing and Wavelength Assignment Information Encoding for Wavelength Switched Optical Networks," Network Working Group, Internet Draft, draft-ietf-ccamp-rwa-wson-encode-03.txt, Oct. 8, 2009, 37 pages.

Bernstein, G., et al., "Routing and Wavelength Assignment Information Encoding for Wavelength Switched Optical Networks," Network Working Group, Internet Draft, draft-ietf-ccamp-rwa-wson-encode-04.txt, Feb. 18, 2010, 34 pages.

Lee, Y., et al., "Framework for GMPLS and PCE Control of Wavelength Switched Optical Networks (WSON)," Network Working Group, Internet Draft, draft-ietf-ccapm-rwa-wson-framework-01.txt, Feb. 9, 2009, 94 pages.

Lee, Y., et al., "Framework for GMPLS and PCE Control of Wavelength Switched Optical Networks (WSON)," Network Working Group, Internet Draft, draft-ietf-ccapm-rwa-wson-framework-05.txt, Feb. 1, 2010, 59 pages.

Aggarwal, R., et al., "Advertising a Router's Local Addresses in OSOF TE Extensions," Network Working Group, Internet Draft, draft-ietf-ospf-te-node-addr-00.txt, Sep. 2003, 9 pages.

Aggarwal, R., et al., "Advertising a Router's Local Addresses in OSPF TE Extensions," Network Working Group, Internet Draft, draft-ietf-ospf-te-node-addr-05.txt, Nov. 18, 2008, 8 pages.

Aggarwal, R., et al., "Advertising a Router's Local Addresses in OSPF TE Extensions," Network Working Group, Internet Draft, draft-ietf-ospf-te-node-addr-07.txt, Dec. 2, 2009, 9 pages.

Li, D., et al., "Evaluation of Possible Interior Gateway Protocol Extensions for Wavelength Switching Optical Networks," Network Working Group, Internet Draft, draft-li-ccamp-wson-igp-eval-01.txt, Jul. 11, 2008, 17 pages.

Zhang, F., et al., "OSPF Extensions in Support of Routing and Wavelength Assignment (RWA) in Wavelength Switched Optical Networks (WSONs)," Network Working Group, Internet Draft, draft-zhang-ccamp-rwa-wson-routing-ospf-00.txt, Mar. 2, 2009, 18 pages.

Zhang, F., et al., "OSPF Extensions in Support of Routing and Wavelength Assignment (RWA) in Wavelength Switched Optical Networks (WSONs)," Network Working Group, Internet Draft, draft-zhang-ccamp-rwa-wson-routingospf-01.txt, Jul. 13, 2009, 15 pages.

Zhang, F., et al., "OSPF Extensions in Support of Routing and Wavelength Assignment (RWA) in Wavelength Switched Optical Networks (WSONs)," Network Working Group, Internet Draft, draft-zhang-ccamp-rwa-wson-routing-ospf-02.txt, Oct. 23, 2009, 14 pages.

Bernstein, G., et al., Modeling WDM Wavelength Switching Systems for Use in Automated Path Computation, Jun. 20, 2008, 7 pages.

Bradner, S., "Key Words for use in RFCs to Indicate Requirement Levels," Network Working Group, RFC 2119, Mar. 1997, 3 pages.

Moy, J., "OSPF Version 2," Network Working Group, RFC 2328, Apr. 1998, 244 pages.

Coltun, R., "The OSPF Opaque LSA Option," Network Working Group, RFC 2370, Jul. 1998, 15 pages.

Berger, L., "Generalized Multi-Protocol Label Switching (GMPLS) Signaling Functional Description," Network Working Group, RFC 3471, Jan. 2003, 31 pages.

Katz, D., et al., "Traffic Engineering (TE) Extensions to OSPF Version 2," Network Working Group, RFC 3630, Sep. 2003, 14 pages.

Mannie, E., "Generalized Multi-Protocol Label Switching (GMPLS) Architecture," Network Working Group, RFC 3945, Oct. 2004, 69 pages.

Kompella, K., et al., "Routing Extensions in Support of Generalized Multi-Protocol Label Switching (GMPLS)," Network Working Group, RFC 4202, Oct. 2005, 25, pages.

Kompella, K., et al., "OSPF Extensions in Support of Generalized Multi-Protocol Label Switching (GMPLS)," Network Working Group, RFC 4203, Oct. 2005, 10 pages.

Farrel, A., et al., "A Path Computation Element (PCE)-Based Architecture," Network Working Group, RFC 4655, Aug. 2006, 38 pages.

Berger, L., et al., "The OSPF Opaque LSA Option," Network Working Group, RFC 5250, Jul. 2008, 18 pages.

Foreign Communication From a Related Counterpart Application, PCT Application PCT/CN2010/070796, International Search Report dated May 27, 2010, 4 pages.

Foreign Communication From a Related Counterpart Application, PCT Application PCT/CN2010/070796, Written Opinion dated May 27, 2010, 7 pages.

Office Action dated Aug. 2, 2012, U.S. Appl. No. 12/711,387, filed Feb. 2, 2010, 10 pages.

Notice of Allowance dated Nov. 21, 2012, U.S. Appl. No. 12/711,387, filed Feb. 2, 2010, 13 pages.

\* cited by examiner

OPEN SHORTEST PATH FIRST EXTENSIONS IN SUPPORT OF WAVELENGTH SWITCHED OPTICAL NETWORKS

CROSS-REFERENCE TO RELATED APPLICATIONS

The present application is a continuation of U.S. patent application Ser. No. 12/711,387 filed Feb. 24, 2010 by Bernstein et al., and entitled "Open Shortest Path First Extensions in Support of Wavelength Switched Optical Networks," which claims priority to U.S. Provisional Patent Application No. 61/156,285 filed Feb. 27, 2009 by Bernstein et al., and entitled "Open Shortest Path First Extensions in Support of Wavelength Switched Optical Networks," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. To complete the RWA process, sufficient information must be provided to this process to insure its successful completion. As such, the RWA continues to be one of the challenges in implementing WDM technology in optical networks.

SUMMARY

In one embodiment, the disclosure includes a network component comprising a generalized multiprotocol label switching (GMPLS) control plane controller configured to implement a method comprising transmitting a message to at least one adjacent control plane controller, wherein the message comprises a Type-Length-Value (TLV) indicating RWA information, wherein the TLV comprises a Node Attribute TLV, a Link Set TLV, or both, and wherein the TLV further comprises at least one sub-TLV indicating additional RWA information.

In another embodiment, the disclosure includes a method comprising communicating an open shortest path first (OSPF) link state advertisement (LSA) message comprising a TLV with at least one sub-TLV to a GMPLS control plane controller, wherein the TLV comprises a Node Attribute TLV, a Link Set TLV, or both, and wherein the TLV further comprises at least one sub-TLV indicating RWA information.

In yet another embodiment, the disclosure includes an apparatus comprising a GMPLS control plane controller configured to communicate a LSA comprising a TLV to at least one adjacent control plane controller, wherein the TLV comprises a Node Attribute TLV, a Link Set TLV, or both, and wherein the TLV further comprises at least one sub-TLV with RWA information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
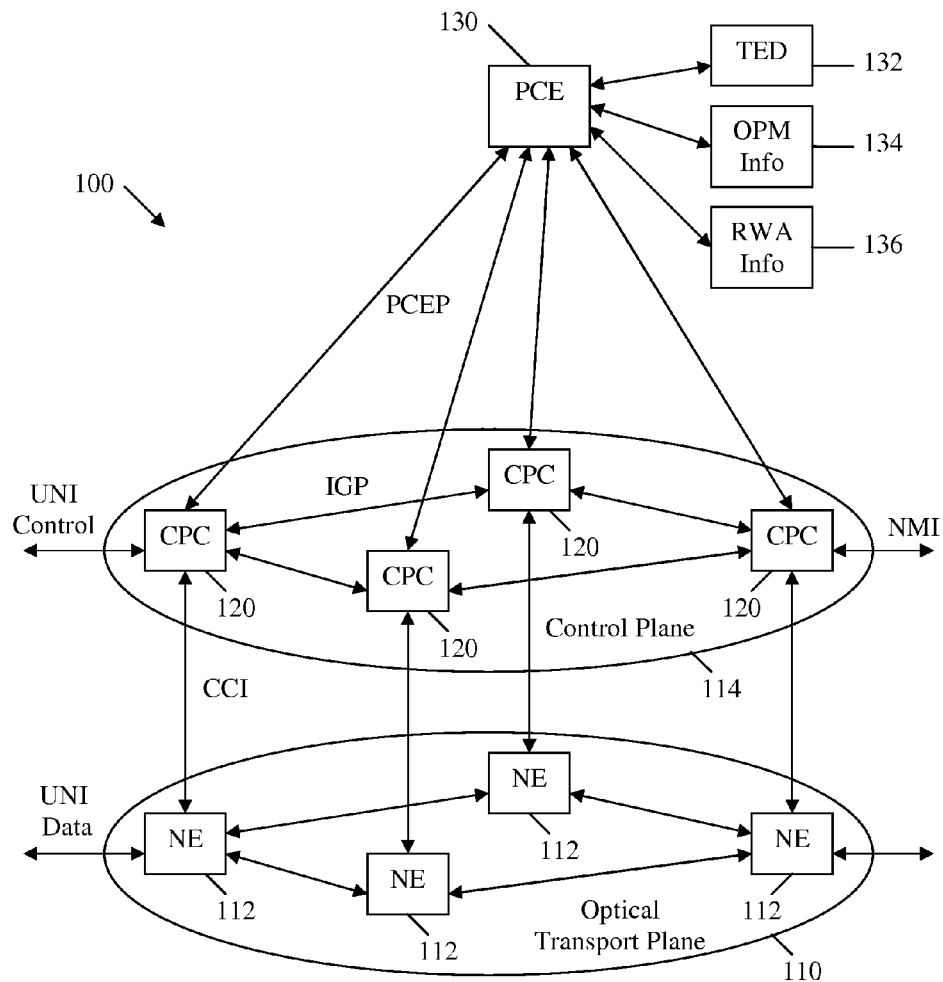
FIG. 1 is a schematic diagram of an embodiment of a WSON system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In WSONs where there are no, or a limited number of, switches capable of wavelength conversion, paths must be set up subject to the "wavelength continuity" constraint. This leads to a path computation problem known as RWA. In order to perform such computations, it is necessary to collect information about the available wavelengths within the network. A framework exists for applying GMPLS and the PCE architecture to control WSONs to address the RWA problem. An existing information model specifies the information needed at various points in a WSON in order to compute paths and establish Label Switched Paths (LSPs). Based on the information model, efficient protocol-independent encodings of the information needed by the RWA process in a WSON can be provided. Such encodings can be used to extend GMPLS signaling and routing protocols.

In order to enable GMPLS to support RWA in WSONs networks, extensions to the OSPF routing protocol are disclosed herein to enhance the defined Traffic Engineering (TE) properties of GMPLS TE. The enhancements to the TE properties of GMPLS TE links can be announced in OSPF TE LSAs. The TE LSA, which is an opaque LSA with area flooding scope, has only one top-level TLV triplet and has one or more nested sub-TLVs for extensibility. The top-level TLV can take one of three values: (1) Router Address; (2) Link; and (3) Node Attribute. In accordance with at least some embodiments, sub-TLVs for the Link TLV and Node Attribute TLV are enhanced in support of RWA in a WSON under the control of GMPLS.

Disclosed herein is a system and method that compactly encodes information needed for RWA in WDM networks, such as the WSON. Specifically, a control plane controller may send a message to at least one adjacent control plane controller, where the message comprises the RWA information in the form of at least one enhanced TLV or sub-TLV. In at least some embodiments, the enhanced sub-TLV information provides shared risk node group (SRNG) information, connectivity matrix information, wavelength converter pool information (e.g., wavelength converter accessibility information, wavelength conversion range information, and wavelength converter (WC) usage state information), WSON port wavelength restrictions information, available wavelengths information, and shared backup wavelengths information. In at least some embodiments, a Node Attribute TLV and/or a Link TLV includes one or more of the enhanced sub-TLVs described herein. The length of these sub-TLVs may vary.

In WSON networks, generally all the sub-TLVs above are optional, depending on the implementation. For example, a connectivity matrix sub-TLV may appear in the LSAs because WSON switches are presently asymmetric. If there is no connectivity matrix sub-TLV in the LSAs, it is assumed that the switches are symmetrically switching. If there is wavelength conversion functionality in the WSON networks, then wavelength converter accessibility sub-TLVs, wavelength conversion range sub-TLVs, and/or WC usage state sub-TLVs should appear in the LSAs.

FIG. 1 illustrates one embodiment of a WSON system 100. In accordance with embodiments, various sub-TLVs for Link TLVs and/or Node Attribute TLVs are enhanced in support of RWA for the WSON 100 under the control of GMPLS. As shown, the system 100 may comprise an optical transport plane 110 comprising a plurality of NEs 112, a control plane 114 comprising a plurality of control plane controllers 120, and a PCE 130. The NEs 112, control plane controllers 120, and PCE 130 may communicate with each other via optical, electrical, or wireless means. In an embodiment, the NEs 112 may be coupled to one another using optical fibers. Similarly, the control plane controllers 120 may be coupled to one another using optical fibers, perhaps the same optical fibers used to connect the NEs 112. In some cases, these optical fibers may also be considered NEs 112. A plurality of optical signals may be transported through the optical transport plane 110 over lightpaths that may pass through some of the NEs 112. In addition, at least some of the NEs 112, for example those at the ends of the optical transport plane 110, may be configured to convert between electrical signals from external sources, e.g. core network and/or user network interface (UNI) data, and the optical signals used in the optical transport plane 110. Similarly, at least some of the control plane controllers 120, for example those at the ends of the control plane 114, may be configured to convert between electrical signals from external sources, e.g. UNI control and/or network management interface (NMI) signals, and the optical signals used in the control plane 114. Although four NEs 112, four control plane controllers 120, and one PCE 130 are shown in the system 100, the system 100 may comprise any number of NEs 112, control plane controllers 120, or PCEs 130. Moreover, while a one-to-one relationship between the control plane controllers 120 and the NEs 112 is illustrated in FIG. 1, there may be many NEs 112 associated with a single control plane controller 120, or vice-versa. Similarly, while the control plane controllers 120 are associated with a single PCE 130 in FIG. 1, there may be many PCEs 130 in the system 100, and the control plane controllers 120 may be associated with one or more of the PCEs 130 or vice-versa.

The optical transport plane 110 may be part of the system 100 that uses active or passive components to transport optical signals. The optical transport plane 110 may implement WDM to transport the optical signals through the optical transport plane 110, and may comprise various optical components as described in detail below. The optical transport plane 110 may be part of a long haul network, a metropolitan network, or a residential access network.

The NEs 112, also referred to as nodes, may be any devices or components that transport signals through the optical transport plane 110. In an embodiment, the NEs 112 consist essentially of optical processing components, such as line ports, add ports, drop ports, transmitters, receivers, amplifiers, optical taps, and so forth, and do not comprise any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the system 100. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Section (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion (PMD), four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane 114 may be any part of the system 100 that handles operation, administration, and maintenance (OAM), control messages, and/or general administration of the system 100. The control plane 114 may use the optical transport plane 110 to exchange messages, or may have its own message distribution network. The control plane 114 may comprise various control plane controllers 120 as described in detail below.

The control plane controllers 120, also called optical connection controllers, may coordinate activities between the NEs 112. Specifically, the control plane controllers 120 may receive optical connection requests and provide lightpath signaling to the NEs 112 via a connection control interface (CCI), thereby coordinating the NEs 112 such that data signals are routed through the optical transport plane 110 with little or no contention. The control plane controllers 120 may communicate with each other using any suitable protocol, such as GMPLS or an Interior Gateway Protocol (IGP). In addition, the control plane controllers 120 may communicate with the PCE 130 using PCE protocol (PCEP) to provide the PCE 130 with information that may be used for the RWA, receive the RWA from the PCE 130, and/or forward the RWA to the NEs 112. The control plane controllers 120 may be located in a component outside of the NEs 112, such as an external server, or may be part of the NEs 112. In an embodiment, the control plane controllers 120 can compute the RA, the WA, or both.

The PCE 130 may perform all or part of the RWA for the WSON system 100. Specifically, the PCE 130 may receive the wavelength or other information that may be used for the RWA from the control plane controllers 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise or interface with a global traffic-engineering database (TED) 132, a RWA information database 136, an optical performance monitor (OPM) 134, a physical layer constraint (PLC) information database (not shown), or combinations thereof. The PCE 130 may be located in a component outside of the system 100, such as an external server, or may be located in a component within the system 100, such as a control plane controller 120 or a NE 112.

In some embodiments, the RWA information may be sent to the PCE 130 by a Path Computation Client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
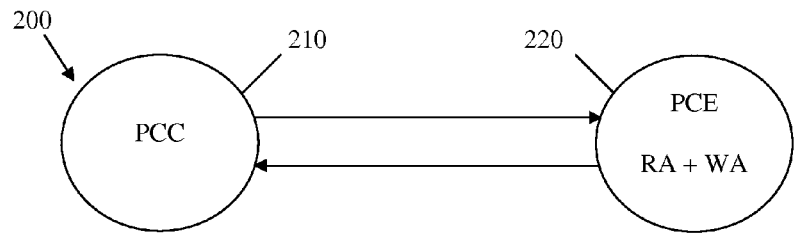
FIG. 2 is a schematic diagram of an embodiment of a path computation element (PCE) architecture.

The PCE 130 may be embodied in one of several architectures. FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
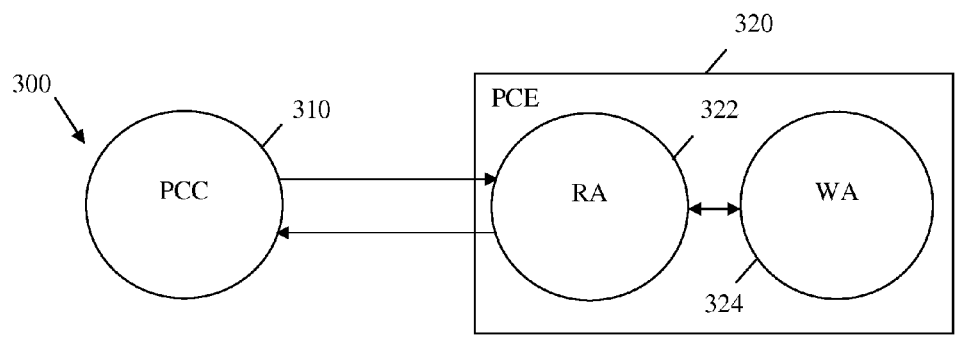
FIG. 3 is a schematic diagram of another embodiment of the PCE architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
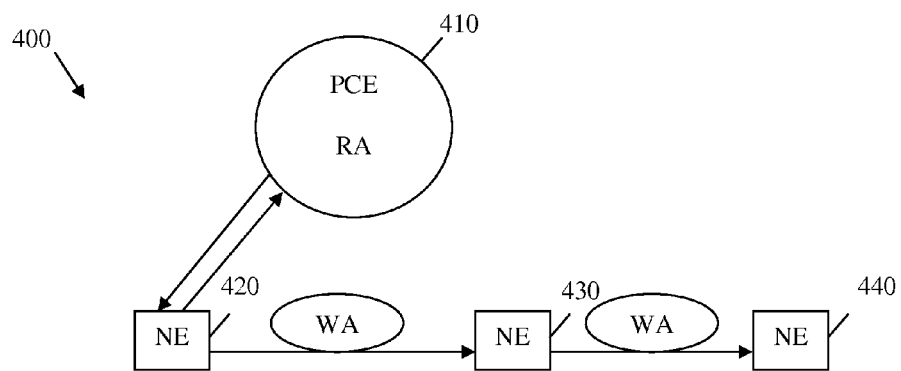
FIG. 4 is a schematic diagram of another embodiment of the PCE architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
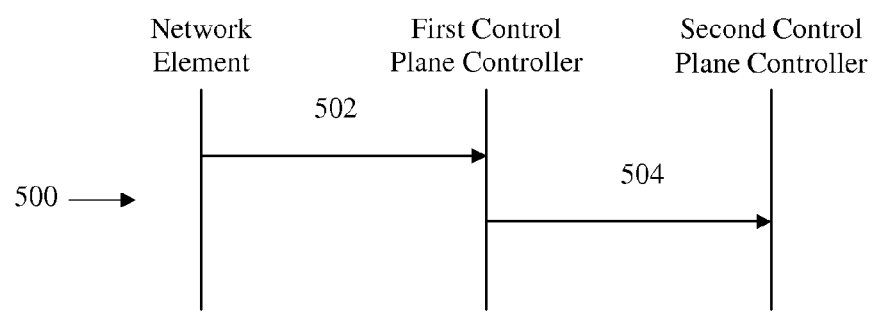
FIG. 5 is a protocol diagram of an embodiment of the communications between a NE, a first control plane controller, and a second control plane controller.

FIG. 5 illustrates an embodiment of a communication method 500 between a NE, a first control plane controller, and a second control plane controller, which may be an adjacent control plane controller. In some embodiments, the method 500 may occur between a NE, a first control plane controller, and the PCE, for example, when the first control plane controller sends the RWA information to the TED in the PCE. In the method 500, the first control plane controller obtains the RWA information 502 from at least one NE. The NE may send the RWA information 502 to the first control plane controller without prompting by the first control plane controller, or the NE may send the RWA information 502 to the first control plane controller in response to a request by the first control plane controller. The first control plane controller then sends a message 504 to the second control plane controller, where the message 504 comprises at least one of the RWA information described below. Specifically, the RWA information may be embodied in at least one Link TLV and/or Node Attribute TLV with one of more of the enhanced sub-TLVs described herein. As used herein, the term TLV may refer to any data structure that carries the RWA information. The message 504 and perhaps the TLV may also comprise a status indicator that indicates whether the RWA information is static or dynamic. In an embodiment, the status indicator may indicate how long the static or dynamic status lasts, so that the second control plane controller can know how long the RWA information is valid and/or when to expect an update. Additionally or alternatively, the message 504 and perhaps the TLV may comprise a type indicator that indicates whether the RWA information is associated with a node, a link, or both.

Figure 6:
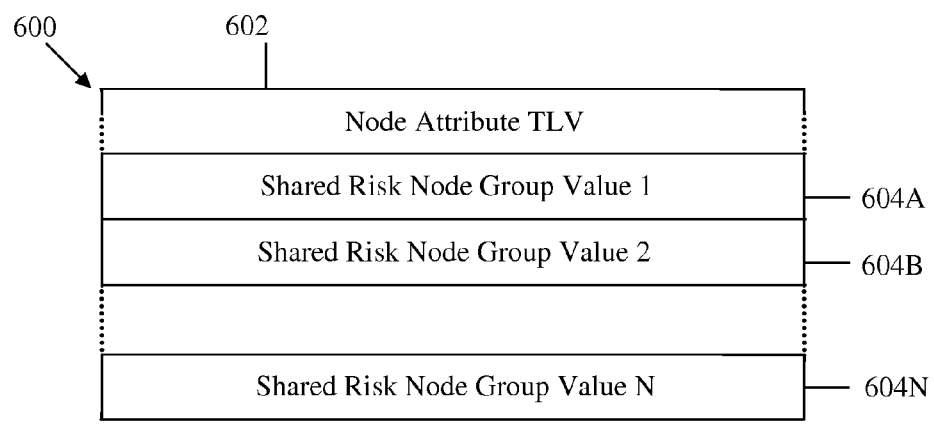
FIG. 6 is a schematic diagram of an embodiment of a Node Attribute TLV with shared risk node group sub-TLV values.

One of the enhanced sub-TLVs disclosed herein is for SRNG values. FIG. 6 is a schematic diagram of an embodiment of an enhanced Node Attribute TLV 600 that comprises a predetermined Node Attribute TLV 602 with SRNG sub-TLV values 604A-604N. In at least some embodiments, the length of each SRNG value is the length of the list in octets. As an example, the SRNG values 604A-604N may comprise an unordered list of 32-bit numbers. The SRNG values 604A-604N may be similar to the SRNGs defined in Internet Engineering Task Force (IETF) document draft-ietf-ccamp-rwa-info-01.txt, which is incorporated herein by reference.

Figure 7:
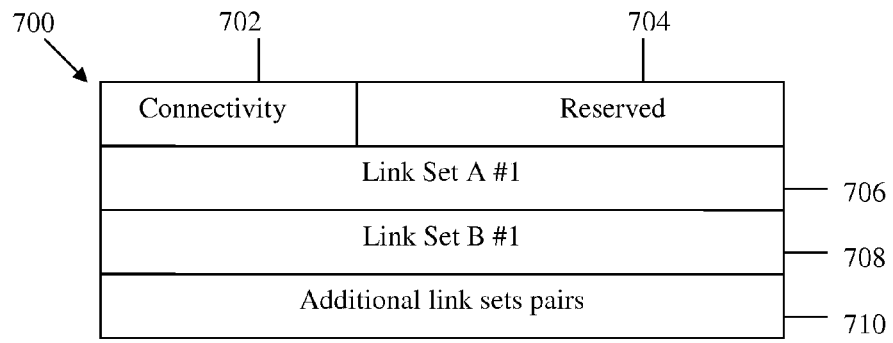
FIG. 7 is a schematic diagram of an embodiment of a connectivity matrix sub-TLV.

Another enhanced sub-TLV disclosed herein is for connectivity matrix values. FIG. 7 is a schematic diagram of an embodiment of a connectivity matrix sub-TLV 700. In accordance with at least some embodiments, the connectivity matrix sub-TLV 700 is a sub-TLV of a Node Attribute TLV. As shown, the sub-TLV 700 comprises a connectivity field 702, a reserved field 704, Link Set A values 706, and Link Set B values 708. The sub-TLV 700 may further comprise additional Link Set pair values 710 as needed to specify connectivity. In accordance with at least some embodiments, the connectivity matrix sub-TLV 700 identifies which ingress ports and wavelengths can be connected to a specific egress port. The connectivity matrix sub-TLV 700 may identify either the potential connectivity matrix for asymmetric switches (e.g., ROADMs and such) or fixed connectivity for an asymmetric device such as a multiplexer. In either case, the information is useful because the switching devices in a WSON are highly asymmetric. In accordance with embodiments, one sub-TLV 700 contains one matrix. Further, the connectivity matrix sub-TLV 700 may occur more than once such that multi-matrices are provided within the same Node Attribute TLV.

In at least some embodiments, the connectivity field 702 may comprise the first about seven bits of the sub-TLV 700, and may indicate the reconfigurability of a network element. For example, the connectivity field 702 may be set to "0" when the network element is fixed. In such case, the connectivity matrix sub-TLV 700 represents the potential connectivity matrix of asymmetric fixed deices or the fixed part of a "hybrid" device. Additionally, the connectivity field 702 may be set to "1" when the network element is reconfigurable, as is the case with a ROADM or OXC. In such case, the connectivity matrix sub-TLV 700 represents the potential connectivity matrix for asymmetric switches.

The reserved field 704 may be the subsequent about 24 bits of the sub-TLV 700, and may be used for other purposes. In at least some embodiments, the reserved field bits are set to zero upon transmission and/or are ignored upon reception. The Link Set A 706 may be variable in length and may specify the ingress links for the node. The Link Set B 708 may be variable in length and may specify the egress links for the node. The additional Link Sets 710 may be variable in length and may specify any additional links. In at least some embodiments, the order of the Link Set A 706, the Link Set B 708, and the additional Link Sets 710 is unimportant (e.g., the Link Sets 706, 708 and 710 may be arranged in any order).

The connectivity matrix sub-TLV 700 may be better understood by applying it to a two-degree, 40-channel ROADM as an example. The ROADM may have one line side ingress port, one line side egress port, 40 add ports, and 40 drop ports. The ports may be numbered and identified according to the link to which they are connected, such that the line side ingress port can be identified by link local identifier #1, the 40 add ports can be identified by link local identifiers #2-#41, the egress line side port can be identified by link local identifier #42, and the 40 drop ports can be identified by link local identifiers #43-#82. Within the ROADM, the line side ingress port may be connected to the line side egress port and to all of the drop ports. Similarly, the add ports may be connected to the line side egress port, but not any of the drop ports.

Figure 8:
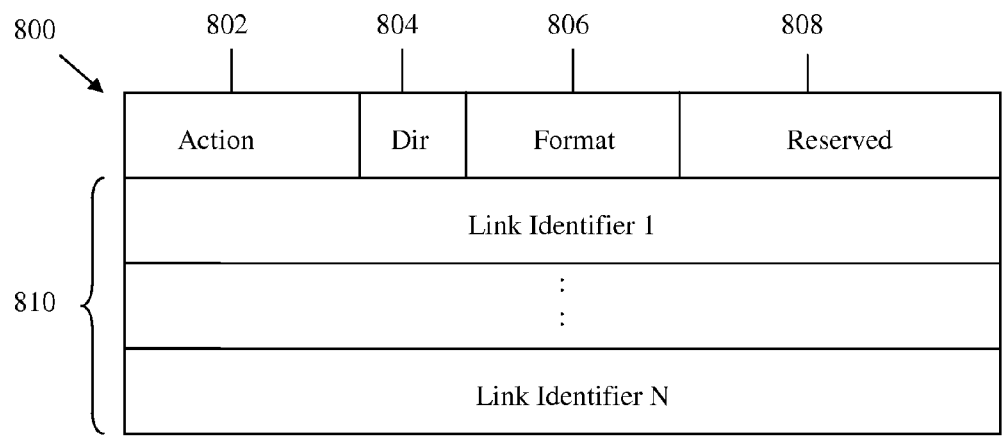
FIG. 8 is a schematic diagram of an embodiment of a Link Set object.

In at least some embodiments, a connectivity matrix sub-TLV 700 includes a Link Set object. FIG. 8 is a schematic diagram of an embodiment of such a Link Set object 800. As shown, the Link Set object 800 comprises an action field 802, a directionality ("Dir") field 804, a format field 806, and a reserved field 808. Further, the Link Set object 800 comprises a plurality of link identifiers 810.

In at least some embodiments, the action field 802 comprises around 8 bits with select values being defined (e.g., as flag values) and other values being reserved. For example, a value 0x01 may indicate an inclusive list where one or more link elements are included in the Link Set. Meanwhile, a value 0x02 may indicate an inclusive range of links, where two elements define the range (e.g., the first element indicates the start of the range and the second element indicates the end of the range). A value of "0" indicates that there is no bound on the corresponding portion of the range. The directionality field 804 comprises, for example, two bits to indicate a Link Set directionality. For example, a value of 0x01 indicates a bidirectional Link Set, and a value of 0x02 indicates links in the Link Set are from the incoming direction. Meanwhile, a value of 0x03 indicates links in the Link Set are to the outgoing direction.

The format field 806 comprises, for example, 6-bits to indicate the format of the link identifier. In an embodiment, a value of 0x01 indicates that the links in the Link Set are identified by the link local identifiers. The reserved field 808 comprises, for example, 16-bits. In some embodiments, the reserved field bits are set to zero on transmission and/or are ignored on receipt. Each of the link identifiers 810 comprises, for example, 32-bits to indicate an interface IP address to identify the incoming or outgoing port corresponding to the link. The format of each link identifier 810 should comply with existing Local/Remote Interface IP Address protocols.

Other enhanced sub-TLVs disclosed herein are for wavelength converter pool information. Because a WSON node may include wavelength converters, at least some embodiments encode structure and properties of a general wavelength converter pool based on a converter accessibility sub-TLV, a wavelength converter range sub-TLV and/or a WC usage state sub-TLV as described herein.

In at least some embodiments, the wavelength converter accessibility information is provided in a sub-TLV of the Node Attribute TLV. The information in the wavelength converter accessibility sub-TLV indicates the ability of an ingress port to reach a wavelength converter and of a wavelength converter to reach a particular egress port. The length of the length converter accessibility sub-TLV corresponds to the length of the value field in octets. In at least some embodiments, the wavelength converter accessibility sub-TLV occurs at most once within the Node Attribute TLV.

The wavelength converter range information is also provided in a sub-TLV of the Node Attribute TLV. Because wavelength converters may have a limited input or output range, this range may be specified using one or more wavelength conversion range sub-TLVs. The length of a wavelength converter range sub-TLV corresponds to the length of the value field in octets. Wavelength converter range sub-TLVs may occur more than once within a given Node Attribute TLV.

The WC usage state information may also be provided as a sub-TLV of a Node Attribute TLV. The WC usage state indicates the usage state of wavelength converters. The length of the WC usage state sub-TLV corresponds to the length of the value field in octets. In at least some embodiments, the WC usage state sub-TLV occurs at most once within the Node Attribute TLV.

As disclosed herein, various other sub-TLVs may be added to enhance a Link Set TLV. For example, a WSON Port Wavelength Restrictions sub-TLV, an available wavelengths sub-TLV, and/or a shared backup wavelengths sub-TLV may be added to a Link Set TLV. In WSON networks, generally all these sub-TLVs above are optional, depending on the implementation. As a default configuration, there are no restrictions on wavelength, so the WSON Port Wavelength Restrictions sub-TLV may not appear in the LSAs. Meanwhile, in order to be able to compute RWA, an available wavelengths sub-TLV may appear in the LSAs. Even without available wavelength information, path computation may be performed by guessing what wavelengths may be available (e.g., high blocking probability or distributed wavelength assignment may be used). The shared backup wavelengths sub-TLV should not appear in the LSAs, if there is no wavelength backup functionality in the WSON networks.

More specifically, the WSON Port Wavelength Restrictions sub-TLV describes the wavelength (label) restrictions that the link and various optical devices (e.g., OXCs, ROADMs, and waveband multiplexers) may impose on a port. These restrictions represent what wavelength may or may not be used on a link and are relatively static. As an example, if a given WSON link only supports some specific wavelengths switching, these wavelength restrictions should be reflected in the routing to be convenient for wavelength path computation. In WSON networks, the wavelength continuity along the wavelength LSP should be ensured.

Figure 9:
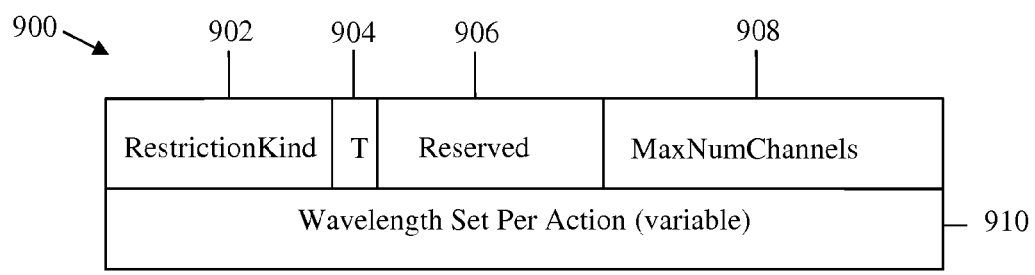
FIG. 9 is a schematic diagram of an embodiment of a port wavelength restrictions sub-TLV.

FIG. 9 is a schematic diagram of an embodiment of a port wavelength restrictions sub-TLV 900. As shown, the port wavelength restrictions sub-TLV 900 comprises a RestrictionKind field 902, a T field 904, a reserved field 906 and a MaxNumChannels field 908. The port wavelength restrictions sub-TLV 900 also comprises a "wavelength set per action" field 910 that may vary. The reserved field 906 may be reserved for other purposes, and may be set to zero by the sender and ignored by the receiver. The T field 904 may be a flag used for various purposes. In at least some embodiments, the RestrictionKind field 902 comprises, for example, 8 bits to indicate restriction type information. As an example, a RestrictionKind value of 0x01 may indicate simple wavelength selective restriction. In such case, the MaxNumChannels (Max number of channels) field 908 indicates the maximum number of wavelengths permitted on the port and the accompanying wavelength set 910 indicates the specific permitted wavelengths. As another example, a RestrictionKind value of 0x02 may indicate a waveband device with a tunable center frequency and passband. In such case, the MaxNumChannels (Max number of channels) field 908 indicates the maximum width of the waveband in terms of the channels spacing given in the wavelength set. The corresponding wavelength set 910 is used to indicate the overall tuning range. Specific center frequency tuning information can be obtained from dynamic channel in use information. The length of the port wavelength restrictions sub-TLV 900 corresponds to the length of the value field in octets. In at least some embodiments, the port wavelength restrictions sub-TLV may occur more than once to specify a complex port constraint within the link TLV.

Available wavelengths information also may be provided in a sub-TLV of the link TLV. An available wavelengths sub-TLV indicates the wavelengths available for use on the link. Note that there are five approaches for a wavelength set which may be used to represent the available wavelengths information. Considering that the continuity of the available or unavailable wavelength set can be scattered for the dynamic wavelength availability, there is a burden associated with routing to reorganize the wavelength set information when the inclusive (or exclusive) list (or range) approaches are used to represent available wavelengths information. Therefore, in some embodiments, only the bitmap set is used for representing available wavelengths information.

Various requirements for the global semantics wavelength label and the corresponding standardized wavelength label are known. Because the wavelength continuity along the wavelength LSP should be ensured without wavelength conversion or with partial wavelength conversion, the wavelength availability information (excepting wavelength connectivity information) is needed when computing a wavelength LSP. As an example, the wavelength label range [wavelength 1, wavelength 5] of fiber 1 may be connected to the same wavelength label range of fiber 2. In some cases only wavelength 3 is available to carry the traffic, while other wavelength labels are occupied. Therefore, in order to compute a wavelength path, the available wavelength information needs to be known by the node performing the computation. If the wavelength availability information is not known by the node performing the path computation, then the computation can only be performed at the level of TE links. In such case, wavelength assignments are resolved locally by the switches on a hop-by-hop basis enhanced by signaling protocol mechanisms used to negotiate label selection. However, this scenario may be very inefficient in the signaling protocol, and can easily lead to blocking problems where a path is selected for which there is no suitable wavelength availability (unless some or all of the switches along the path are capable of full wavelength conversion). In the general case of limited or no wavelength conversion, information on wavelength availability enables efficient and accurate path computation.

A standardized label format is described in IETF document draft-ietf-ccamp-gmpls-g-694-lambda-labels-04.txt, which is incorporated herein by reference. If the standardized label format is used directly to identify the status of every wavelength, the wavelength information may be a little more large-scale, because a WSON link often supports many wavelengths (e.g., 80 or 160 wavelength systems). To minimize the size of information, a bitmap wavelength set may be used to indicate the wavelength availability information of a fiber. In such case, only one bit is used to indicate the status of a certain wavelength (the wavelength is either available or not available).

Figure 10:
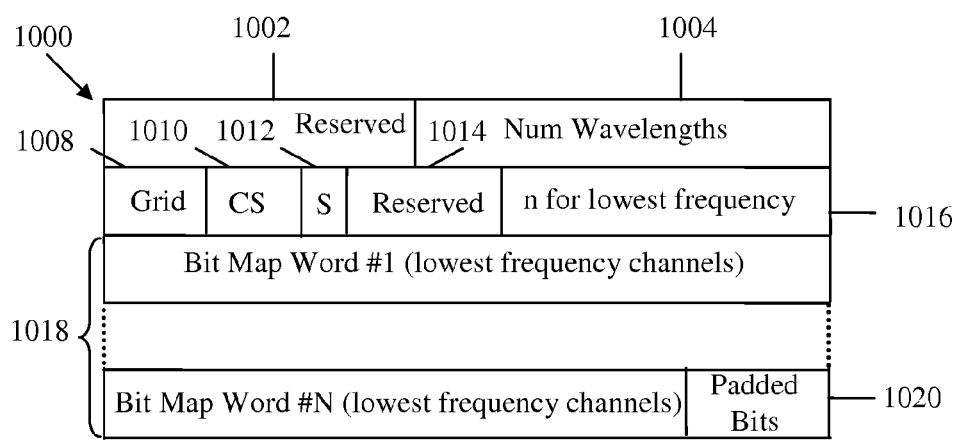
FIG. 10 is a schematic diagram of an embodiment of a wavelength availability sub-TLV.

FIG. 10 is a schematic diagram of an embodiment of a wavelength availability sub-TLV 1000. The wavelength availability sub-TLV 1000 may correspond, for example, to a sub-TLV of a link TLV. The wavelength availability sub-TLV 1000 may be used to encode at least one type of the RWA information discussed below when the RWA information is associated with at least one node, link, and/or wavelength.

In at least some embodiments, the wavelength availability sub-TLV 1000 comprises reserved bits 1002 and a Num Wavelengths field 1004. The reserved field 1002 may be reserved for other purposes, and may be set to zero by the sender and ignored by the receiver. The Num Wavelengths field 1004 comprises, for example, 8 bits to indicate the number of wavelengths of the link. Further, each bit in the bit map 1018 represents a particular frequency with a value of I/O indicating whether the frequency is available or not. Bit position "0" of the bit map 1018 represents the lowest frequency, while each succeeding bit position represents the next frequency above the previous frequency. The channel spacing (CS) between adjacent frequencies is designated by the CS field 1010. For example, the CS field 1010 may be set to "1" to indicate a channel spacing of about 12.5 gigahertz (GHz), the CS field 1010 may be set to "2" to indicate a channel spacing of about 25 GHz, or the CS field 1010 may be set to "3" to indicate a channel spacing of about 50 GHz. Further, the CS field 1010 may be set to "4" to indicate a channel spacing of about 100 GHz, or the CS field 1010 may be set to "5" to indicate a channel spacing of about 200 GHz. Further, the S field 1012 may comprise about one bit to indicate the sign used to offset from the center frequency. For example, the S field 1012 may be set to "0" to indicate a positive (+) sign and may be set to "1" to indicate a negative (−).

Meanwhile, the grid field 1008 may comprise about four bits to indicate the WDM grid specification being used. For example, the grid field 1008 may be set to "1" to indicate an ITU-T DWDM wavelength grid, or the grid field 1008 may be set to "2" to indicate an ITU-T CWDM wavelength grid. As shown, the wavelength availability sub-TLV 1000 also comprises a reserved field 1014 (similar to the aforementioned reserved fields) comprising about eight bits and an "n for lowest channel" field 1016 comprising about 16 bits to specify a specific frequency or wavelength. As an example, n may be an integer used to specify a frequency using the formula:

$$\text{Frequency}=193.1 \text{ terahertz(THz)} \pm n*(\text{channel spacing})$$

where the ± is selected based on the sign indicated in the S field 1012 and the channel spacing is defined in the CS field 1010.

The values of the bit map 1018 are "1" if available or "0" if assigned (e.g., in use, or failed, or administratively down, or under testing). In accordance with at least some embodiments, the valid length of the bit map 1018 corresponds to Num Wavelengths field 1004 value. However, padded bits 1020 are also to the bit map 1018 so that the number of bits in the bit map 1018 are aligned with 32-bit fields used for the TLV. The padded bits 1020 may be set to 0 and are ignored. Further, bits in the bit map 1018 that do not represent wavelengths (e.g., those in positions (Num Wavelengths−1) and beyond) may be set to zero and are ignored. The length of the available wavelengths sub-TLV corresponds to the length of the value field in octets. In at least some embodiments, the available wavelengths sub-TLV 1000 may occur at most once within the link TLV.

In accordance with at least some embodiments, a shared backup wavelengths sub-TLV is provided with a link TLV. The shared backup wavelengths sub-TLV indicates the wavelengths available for shared backup use on a link. The length of the shared backup wavelengths sub-TLC corresponds to the length of the value field in octets. In at least some embodiments, the shared backup wavelengths sub-TLV may occur at most once within the link TLV.

Procedures for routing flooding are also described herein. In accordance with at least some embodiments, all the sub-TLVs are nested to top-level TLV(s) and contained in Opaque LSAs. The flooding of Opaque LSAs follow predetermined rules. In the WSON networks, the node information and link information can be classified as two kinds. A first kind is relatively static information such as Node ID and Connectivity Matrix information. The other kind is dynamic information such as WC usage state and available wavelengths information. In accordance with at least some embodiments, a WSON implementation should take measures to avoid frequent updates of relatively static information when the relatively static information is not changed. Accordingly, a mechanism may be applied such that static information and dynamic information are contained in separate Opaque LSAs to avoid unnecessary updates of static information when dynamic information is changed. Further, as with other TE information, a WSON implementation should take measures to avoid rapid and frequent updates of routing information that could cause the routing network to become swamped. Accordingly, a threshold mechanism may be applied such that updates are only flooded when a number of changes have been made to the wavelength availability information within a specific time. Such mechanisms are configurable if they are implemented.

In some embodiments, all of the information in the enhanced sub-TLVs described herein may be needed to compute the RWA solution. For example, the SRNG information, connectivity matrix information, wavelength converter pool information (e.g., wavelength converter accessibility information, wavelength conversion range information, WC usage state information), WSON port wavelength restrictions information, available wavelengths information, and shared backup wavelengths information disclosed herein may be required for the PCE or control plane controller to calculate the RWA in the combined RWA architecture described above. However, in other embodiments, only some of the sub-TLV information described herein may be required to calculate the RWA. For example, the wavelength availability information may not be needed by the PCE or control plane controller in the case of the distributed WA architecture 400 described in FIG. 4. Thus, the RWA information that the PCE and/or the control plane controller needs may vary from case to case.

Figure 11:
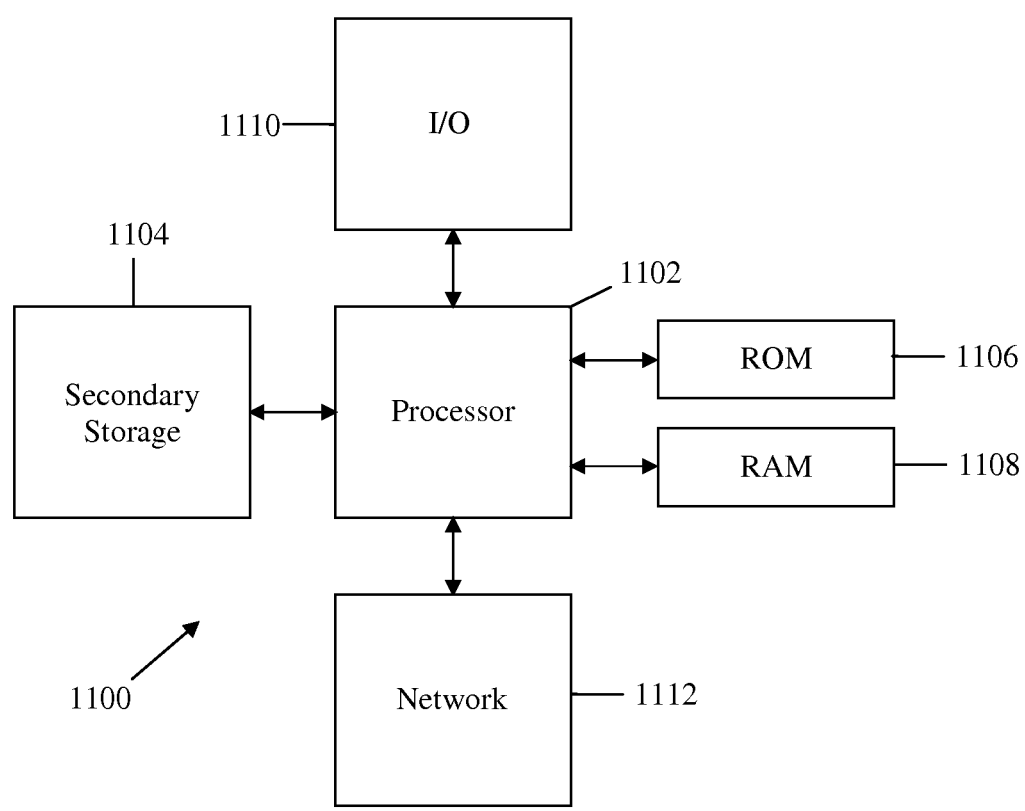
FIG. 11 is a schematic diagram of an embodiment of a general-purpose of computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component suitable for implementing one or more embodiments of the components disclosed herein. The network component 1100 comprises a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    transmitting, by a generalized multiprotocol label switching (GMPLS) control plane controller, Traffic Engineering (TE) properties of GMPLS TE links in an open shortest path first (OSPF) Traffic Engineering (TE) link state advertisement (LSA),
    wherein the TE LSA comprises a Generic Node Attribute type length value (TLV) which carries attributes related to a general network element.

2. The method of claim 1, wherein the Generic Node Attribute TLV comprises a Connectivity Matrix sub-TLV which represents either a potential connectivity matrix for asymmetric switches or fixed connectivity for an asymmetric device.

3. The method of claim 2, wherein the Generic Node Attribute TLV comprises more than one Connectivity Matrix sub-TLV to contain multi-matrices within the Generic Node Attribute TLV.

4. The method of claim 2, wherein the Connectivity Matrix sub-TLV comprises a Connectivity field, a Reserved field, Link Set A values, and Link Set B values.

5. The method of claim 4, wherein the Connectivity field is set to a value of 0 to indicate a device is fixed or to a value of 1 to indicate a device is reconfigurable.

6. The method of claim 5, wherein the Link Set A values comprise ingress links.

7. The method of claim 6, wherein the Link Set B values comprise egress links.

8. The method of claim 7, wherein the Connectivity Matrix sub-TLV further comprises a Link Set object.

9. The method of claim 8, wherein the Link Set object comprises an Action field, a Directory field, a Format field, and a plurality of Link Local Identifiers.

10. A method comprising:
    transmitting, by a generalized multiprotocol label switching (GMPLS) control plane controller, Traffic Engineering (TE) properties of GMPLS TE links in an open shortest path first (OSPF) Traffic Engineering (TE) link state advertisement (LSA),
    wherein the TE LSA comprises a Link type length value (TLV), and
    wherein the Link TLV comprises a Port Label Restrictions sub-TLV that describes label restrictions that a network element and a link may impose on a port.

11. The method of claim 10, wherein the network element is an Optical Cross Connect (OXC), Reconfigurable Optical Add Drop Multiplexer (ROADM), or a waveband multiplexer.

12. The method of claim 10, wherein the Port Label Restrictions sub-TLV comprises a RestrictionKind field that indicates restriction type information.

13. The method of claim 12, wherein the RestrictionKind field indicates a simple label selective restriction.

14. The method of claim 13, wherein the Port Label Restrictions sub-TLV further comprises a Label Set Field, and wherein the Label Set Field comprises a label set that indicates labels permitted on the port.

15. The method of claim 12, wherein the RestrictionKind field indicates a label range device with a movable center label and width.

16. The method of claim 15, wherein the Port Label Restrictions sub-TLV further comprises a Label Set Field, and wherein the Label Set Field is used to indicate an overall label range.

17. The method of claim 15, wherein the Port Label Restrictions sub-TLV further comprises a field that indicates a maximum range of the labels.

18. A network element comprising:
    a processor configured to:
        implement a generalized multiprotocol label switching (GMPLS) control plane controller; and
        transmit Traffic Engineering (TE) properties of GMPLS TE links in an open shortest path first (OSPF) Traffic Engineering (TE) link state advertisement (LSA),
        wherein the TE LSA comprises a Generic Node Attribute type length value (TLV) which carries attributes related to a general network element.

19. The network element of claim 18, wherein the Generic Node Attribute TLV comprises a Connectivity Matrix sub-TLV which represents either a potential connectivity matrix for asymmetric switches or fixed connectivity for an asymmetric device.

20. The network element of claim 19, wherein the Connectivity Matrix sub-TLV comprises a Connectivity field, a Reserved field, Link Set A values, and Link Set B values.

* * * * *